United States Patent
Tusch

[19]

[11] Patent Number: 5,783,831
[45] Date of Patent: Jul. 21, 1998

[54] RADIATION EMITTING DEVICE

[75] Inventor: Klaus Norbert Tusch, London, England

[73] Assignee: Colebrand Limited, London, England

[21] Appl. No.: 817,709

[22] PCT Filed: Oct. 5, 1994

[86] PCT No.: PCT/GB94/02189

§ 371 Date: Jun. 4, 1997

§ 102(e) Date: Jun. 4, 1997

[87] PCT Pub. No.: WO96/11412

PCT Pub. Date: Apr. 18, 1996

[51] Int. Cl.[6] .................................................... H05B 3/26
[52] U.S. Cl. ............................ 250/495.1; 250/494.1; 250/504 R
[58] Field of Search ................... 250/495.1, 494.1, 250/493.1, 504 R, 504 H

[56] References Cited

U.S. PATENT DOCUMENTS

| | | | |
|---|---|---|---|
| 4,646,743 | 3/1987 | Parris | 250/495.1 |
| 4,769,527 | 9/1988 | Hart et al. | 250/495.1 |
| 4,922,116 | 5/1990 | Grinberg et al. | 250/495.1 |
| 5,083,034 | 1/1992 | Frank et al. | 250/494.1 |
| 5,247,185 | 9/1993 | Herrera et al. | 250/495.1 |

FOREIGN PATENT DOCUMENTS

| | | |
|---|---|---|
| 0 307 381 | 3/1989 | European Pat. Off. . |
| 0 560 470 | 9/1993 | European Pat. Off. . |

*Primary Examiner*—Kiet T. Nguyen
*Attorney, Agent, or Firm*—McDermott, Will & Emery

[57] ABSTRACT

A flexible tube for providing a radiation emitting source. The flexible tube contains a plurality of spaced infrared emitting diodes uniformly arranged along its length and bent into a circle with ends meeting at a junction. The emitting source is controlled to emit radiation which is not visible to the human eye, but can be detected by a device capable of detecting emitted radiation.

6 Claims, 2 Drawing Sheets ns that wavelengths of 632 and 905 nanometers can be
RADIATION EMITTING DEVICE

TECHNICAL FIELD OF THE INVENTION

This invention relates to a device providing a radiation emitting source which provides emission from an extended area. Radiation emitting sources have been provided for such a purpose, for example, in a fluorescent tube, but this is rigid and fragile.

BACKGROUND OF THE INVENTION

The present invention is concerned with non-visible radiation of frequencies lower than visible radiation. It is an object of the invention to provide a lighting device which can be controlled to emit radiation which cannot be seen by the naked eye but which can be detected by detectors sensitive to the appropriate frequency of the radiation.

U.S. Pat. No. 4,646,743 discloses apparatus for treating animal bodies with radiation of a selected frequency. Although this is for an entirely different purpose from the present invention, there is disclosed a tube which may be flexible and containing an array of broadband infrared diodes. The energization of the diodes is controlled in a manner suitable for treating the animal bodies. It is suggested that wavelengths of 632 and 905 nanometers can be used, since lasers are available at these wavelengths and it is also suggested that operation within a broadband centred at 880 nanometers could be useful. There is no suggestion of providing detectors for the emitted radiation, since the radiation is used to treat the animals carrying the apparatus. Similarly, there is no suggestion that the radiation emitted, even though it is in the infrared region, provides any heating effect from the diodes or any other separate source.

SUMMARY OF THE INVENTION

According to one aspect of the invention there is provided the combination of a radiation emitting device and a detector sensitive to the radiation emitted by the device, the device comprising a flexible tube containing a plurality of discrete infrared radiation emitting sources, the tube walls being translucent to the radiation emitted by the sources, and means to control the energization of the sources.

In another aspect of the invention there is provided a radiation emitting device comprising a flexible tube containing a plurality of discrete infrared radiation emitting sources, the tube walls being translucent to the radiation emitted by the sources, and means to control the energization of the sources, the device further comprising means in addition to said sources for emitting heat radiation. This feature of the device may also be included in the combination of the preceding paragraph. The heat emitting means may comprise an elongated source extending along the tube between a plurality of said infrared radiation emitting sources.

The device in either aspect may comprise sources for emitting radiation of different wavelengths, the control means being arranged to control the source or sources of radiation of one wavelength independently of the source or sources of radiation of another wavelength. The source or sources of one wavelength may constitute the means for emitting heat radiation. The control means may be operable remote from the device, for example, at a remote location using electromagnetic radiation to transmit control signals to the device.

BRIEF DESCRIPTION OF THE DRAWING

Examples of the invention will now be described with reference to the accompanying drawings in which

FIG. 1 is an exemplary diagram of a flexible tube containing a plurality of infrared emitting diodes in an embodiment of the invention.

FIG. 2 is an exemplary diagram of a flexible tube containing a plurality of infrared emitting diodes in another embodiment of the invention.

FIG. 3 is an exemplary diagram of a flexible tube having infrared emitting diodes spaced uniformly along the interior of the tube.

FIG. 4 is an exemplary diagram of a flexible tube having infrared emitting diodes in another embodiment of the invention.

FIG. 5 is an exemplary diagram of a flexible tube having infrared emitting diodes in another embodiment of the invention.

DESCRIPTION OF THE PREFERRED EMBODIMENT

Figure 1:
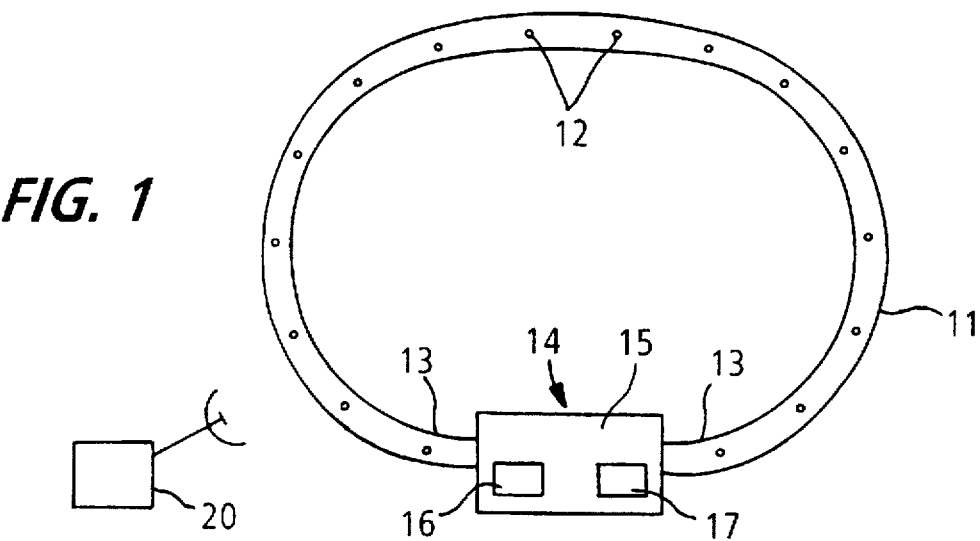
FIGS. 1 to 5 are different embodiments of the invention.

In FIG. 1 a flexible tube 11 containing a plurality of spaced infrared emitting diodes 12 uniformly arranged along its length is bent into a circle with its ends 13 meeting at a junction 14 formed by a control box 15. The tube walls are translucent to infrared radiation and are also armoured so as to protect the radiation emitting sources 12.

The control box 15 includes a battery 16 for energizing the radiation emitting sources and a radio receiver 17 for receiving radio or other electromagnetic control signals from a remote transmitter (not shown), responding to the control signals to energize the diodes 12. The control signals can be arranged to provide a uniform illumination from the diodes, or to emit modulated signals, for example, in the form of an identification code. The control box 15 can also be provided with manual controls 16 so that the wearer can override the control signals from the remote transmitter if the need arises. An observer of the scene uses a detector 20 sensitive to the radiation of the diodes.

The tube can be configured according to its application. In the application where an operator requires to carry such a device on strenuous activities, the tube is preferably formed in a closed curve, the two ends of the curve meeting at a single junction. It can then be worn on the person, for example, around the neck, across the chest from shoulder to waist, or around an arm. The flexibility of the tube makes it comfortable to wear. If the tube is detachable from the unction, tubes of different lengths can be inserted into the junction depending on where the assembly is to be worn on the person or a selected number of modular tubes can be used, the ends of the assembled modules fitting into the junction. In this way, a wide variety of illuminating options can be constructed. The junction itself may house control equipment for controlling the radiation emitting sources or a lead may extend from the unction to a separate control box.

The invention has particular use in night-time operations. The radiation emitting device can be carried by an operator who can operate the control means to provide himself with radiation from the radiation emitting sources, using the detector of the combination to view the surroundings illuminated by those sources. This can be done without being detected by people not equipped with suitable detectors. Even in daytime the device may be used as a When a heat radiation source is provided, the carrier of the device or a remote operator can made it detectable by detectors of the heat radiation or the infrared radiation by operating the control means to energize the appropriate source.

Figure 2:
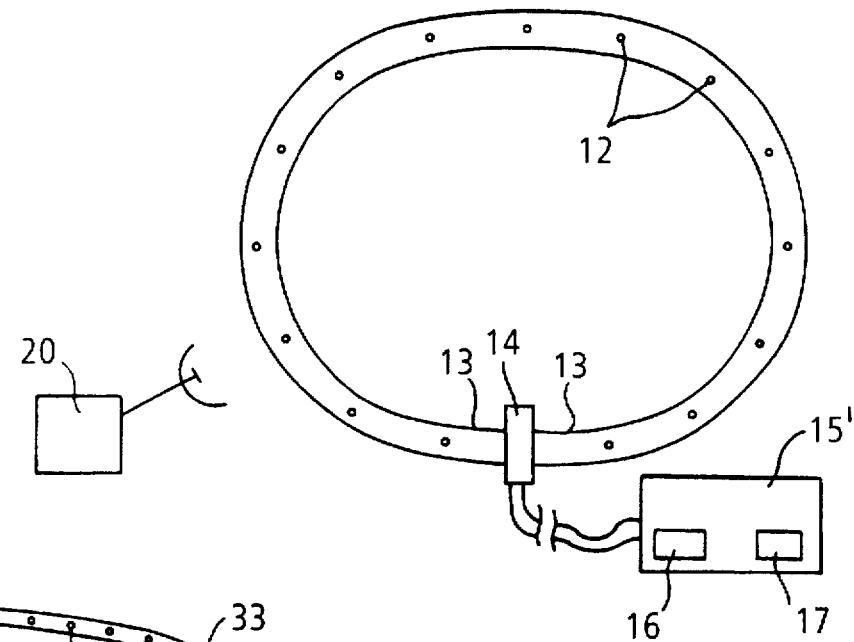

In an alternative embodiment illustrated in FIG. 2, the control box 15' is remote from the junction 14 but is connected thereto by means of electric cables 16. This arrangement enables the collar portion of the lighting assembly to be lighter than in FIG. 1 and the control box 15' to be carried separately, for example, in a pocket so that the inertia of the tube assembly is reduced, making it more comfortable to wear during movement. The flexibility of the tube 11 can be controlled so that either a definite circle as illustrated is maintained or the tube 11 can be bent into any closed curve shape as desired to suit the circumstances.

Figure 3:
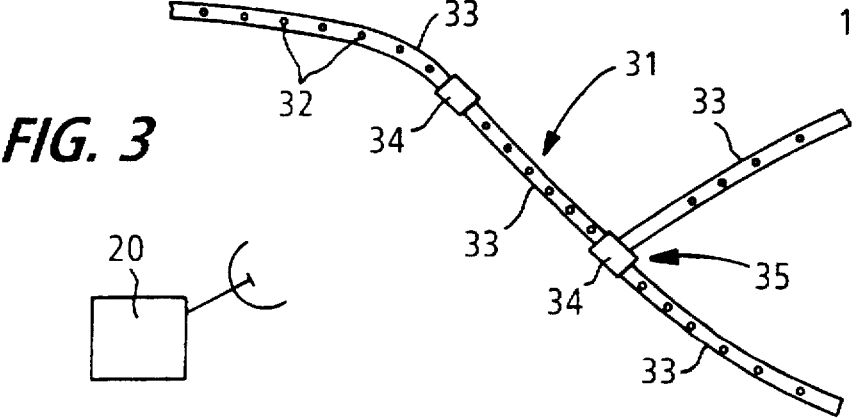

In FIG. 3 a flexible tube 31 is illustrated, with its infrared emitting diodes 32 spaced uniformly along the interior of the tube. The tube can be bent into any desired shape and could be provided in modules 33 with male and female end connectors 34 so that a plurality of modules can be fitted together, with junctions 35 if necessary, to provide desired lighting patterns. It could, for example, be laid along a path and energized when the path needs to be observed.

Figure 4:
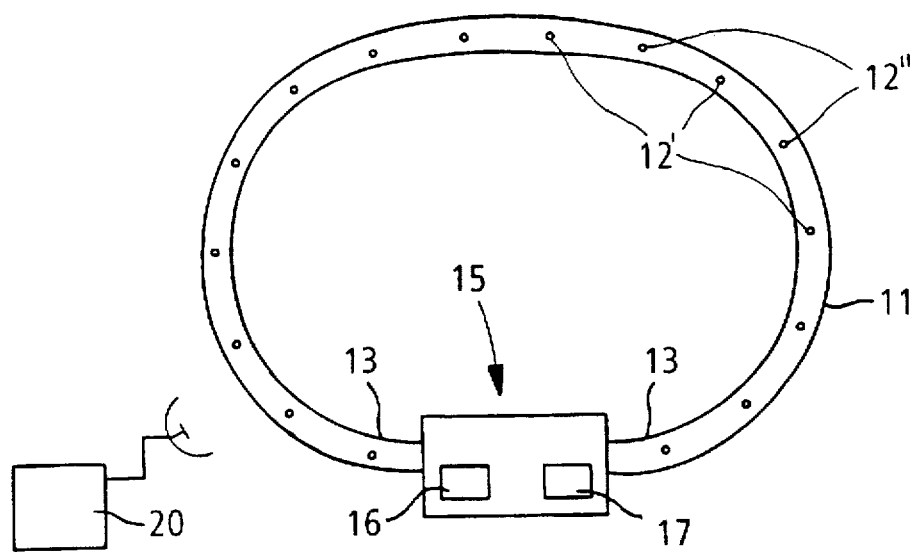
Figure 5:
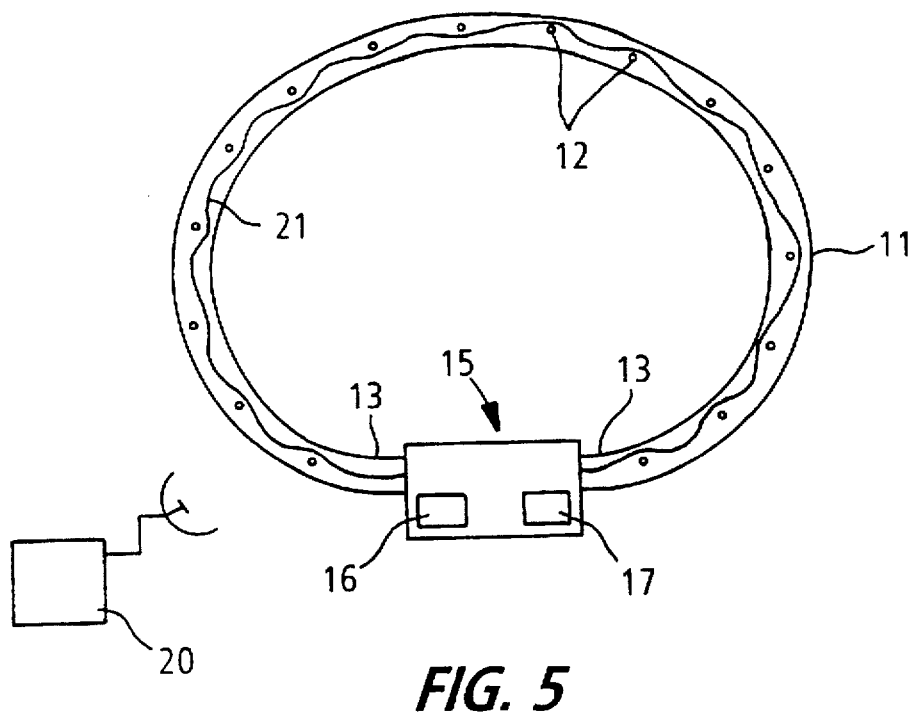

The embodiments so far described have spaced infrared emitting diodes 12 and 32 within the flexible tubes. FIGS. 4 and 5 illustrate further alternative embodiments. In FIG. 4, alternate diodes emit radiation in the infrared region in two different ranges, the first (with diodes 12') being the range to which night vision goggles are sensitive and the second (with diodes 12") being the range to which heat sensitive detectors are sensitive. The diodes of the two types alternate along the length of the tube. The control box 15 can be adapted to energize the diodes of the two types together or selectively, as desired.

In FIG. 5, all the diodes are of one type but a continuous heat emitting wire 21 is provided along at least part of the length of the tube to provide the radiation to which heat sensitive detectors are sensitive. It will be sen that the wire extends beyond at least two diodes 12.

The modifications of alternate diodes and diodes and heating wire arrangements as described with respect to FIGS. 4 and 5 can be applied to the arrangements of FIGS. 1 to 3.

I claim:

1. A radiation emitting device comprising a flexible tube including a heat radiation emitting source and a plurality of discrete infrared radiation emitting sources, said flexible tube having walls being translucent to the radiation emitted by the source therein; and control means to select either a first night-vision mode in which the infrared radiation emitting sources emit radiation in the range to which night vision goggles are sensitive and a second mode in which the heat radiation emitting source emits radiation in the range to which heat sensitive detectors are sensitive.

2. The radiation emitting device according to claim 1 further comprising a detector sensitive to the radiation emitted by the device.

3. The device as claimed in claim 1, wherein the heat emitting means comprises an elongated source extending along the tube between a plurality of said infrared radiation emitting sources.

4. The device as claimed in claim 1 wherein the control means is remotely operable.

5. The device as claimed in claim 4 wherein the device is operable through an electromagnetic radiation communications link.

6. The device as claimed in claim 1 wherein the tube forms a closed curve.

\* \* \* \* \*

UNITED STATES PATENT AND TRADEMARK OFFICE
CERTIFICATE OF CORRECTION

PATENT NO. : 5,783,831
DATED : July 21, 1998
INVENTOR(S) : Klaus Norbert Tusch

It is certified that error appears in the above-indentified patent and that said Letters Patent is hereby corrected as shown below:

On the title page, at "[56] References Cited", under "U.S. Patent Documents", please insert

```
--4,553,546  11/1985  Javelle.................128/395
  4,232,678  11/1980  Skovajsa................128/395
  4,872,458  10/1989  Kanehira et al..........128/401
  4,402,311  09/1993  Hattori.................128/4
  5,019,075  05/1991  Spears et al............606/7
  2,387,258  10/1945  Hague...................128/403--.
```

Under "Foreign Patent Documents", please insert

```
--2 165 670    8/1984   European Pat. Off.
  1 510 687    11/1975  European Pat. Off.
  047 433 0B1  5/1991   European Pat. Off.
  055 117 5A1  1/1993   European Pat. Off--.
```

Signed and Sealed this

Nineteenth Day of January, 1999

Attest:

Attesting Officer

*Acting Commissioner of Patents and Trademarks*